United States Patent [19]

Gilmour

[11] Patent Number: 5,022,015

[45] Date of Patent: Jun. 4, 1991

[54] SONAR SYSTEM OF THE TYPE USING HOLLOW CONICAL BEAMS

[75] Inventor: John E. Gilmour, Pasadena, Md.

[73] Assignee: Westinghouse Electric Corp., Pittsburgh, Pa.

[21] Appl. No.: 532,824

[22] Filed: Jun. 4, 1990

[51] Int. Cl.$^5$ ............................................. G01S 15/00
[52] U.S. Cl. ...................................... 367/124; 367/88
[58] Field of Search .................. 367/124, 125, 88, 136, 367/138, 99

[56] References Cited

U.S. PATENT DOCUMENTS 4,052,693 10/1977 Gilmour ............................... 367/125
4,311,391 1/1982 Gilmour ............................... 367/136

Primary Examiner—Thomas H. Tarcza
Assistant Examiner—Daniel T. Pihulic
Attorney, Agent, or Firm—D. Schron

[57] ABSTRACT

Sonar apapratus which forms concentric hollow conical receiver beams having a common cone axis which is at a predetermined angle relative to the direction of travel of the apparatus as opposed to being coincident with it. A target indication received by a conical beam defines a circle upon which the target might lie. Multiple transmissions and detection of the target in other beams result in intersecting the circles to thereby limit the location of the target to one of two possible points, and one of which may be disregarded depending upon the operational mission.

5 Claims, 7 Drawing Sheets

SONAR SYSTEM OF THE TYPE USING HOLLOW CONICAL BEAMS

BACKGROUND OF THE INVENTION

1. Field of the Invention

The invention in general relates to underwater sonar systems for target detection and/or mapping, and in particular to a system which generates a plurality of spatial receiver beams in the form of hollow cones.

2. Background Information

Sonar systems exist which, during operation, generate a plurality of nested, hollow, conical receiver beams all having the same cone axis. Target returns from one transmission are compared with target returns from a subsequent transmission as the apparatus travels along a course line coincident with the cone axis. As will be brought out, such arrangement requires either a two-dimensional array or two identical linear arrays to obtain all the information needed to locate a target with a high degree particularity.

The improved apparatus of the present invention will allow for target detection and/or mapping utilizing a single array of transducer elements for the generation of multiple concentric hollow conical beams.

SUMMARY OF THE INVENTION

The sonar apparatus of the present invention includes means for periodically projecting acoustic energy toward a target area under investigation during travel of the apparatus along a predetermined course line. Means are provided for receiving reflected acoustic energy from the target area and includes an elongated transducer array and beamformer means operable to form a plurality of nested hollow conical receiver beams all having a common cone axis. The cone axis is maintained at a predetermined angle relative to the course line such that the cone axis and the course line are non-coincident. Means are provided for recording and comparing acoustic returns from at least two successive acoustic projections and displaying the results of the comparison.

DESCRIPTION OF THE PREFERRED EMBODIMENT

Figure 1:
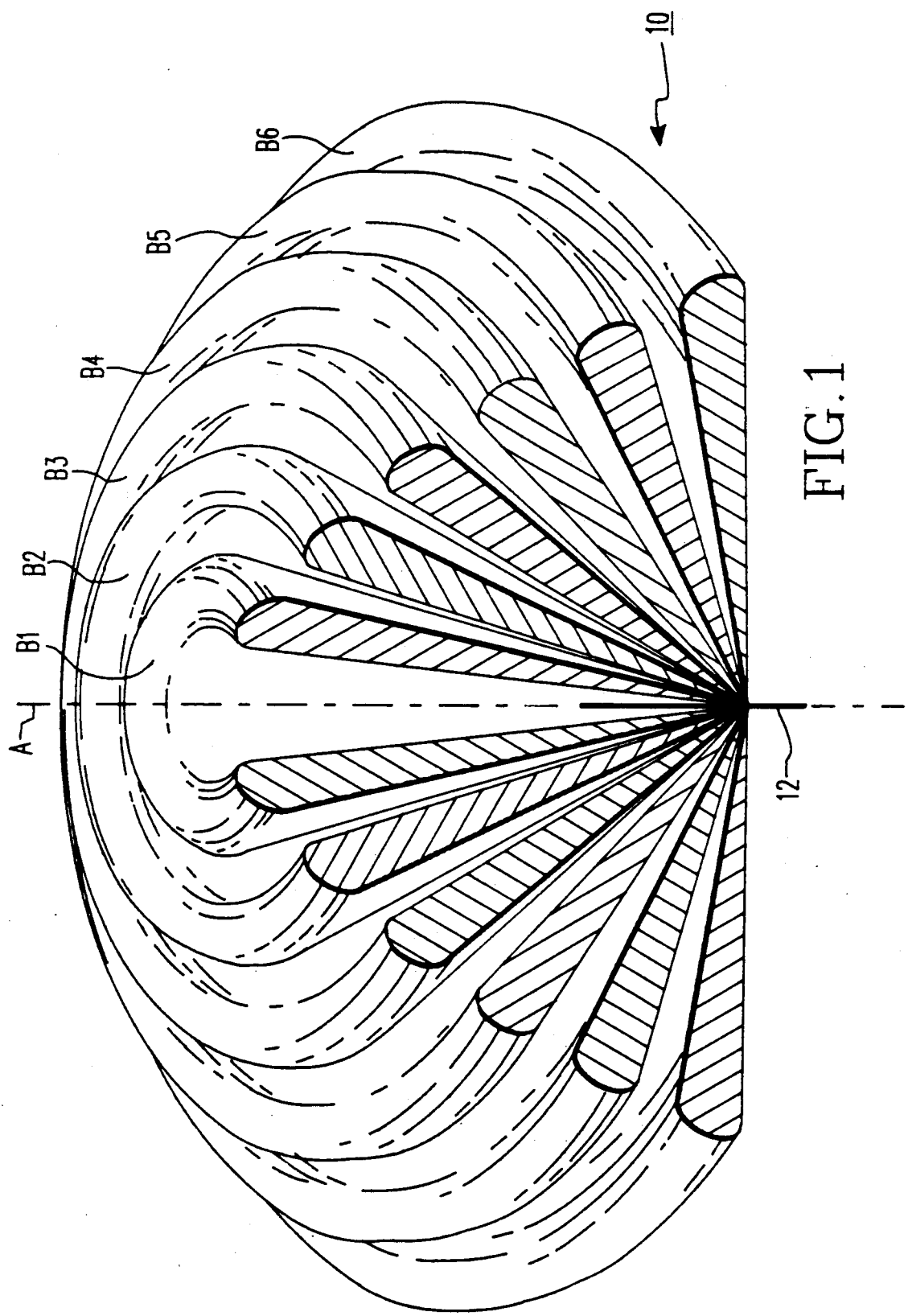
FIG. 1 illustrates, with a portion broken away, a set of nested hollow conical beams.

Referring now to FIG. 1, there is illustrated a set of nested hollow conical beams 10 with the beams, labeled B1 to B6, all having a common cone axis A. Such beams may be formed in a well known manner by signal processing apparatus in conjunction with an elongated rod-like transducer 12 which is coincident with the cone axis. The generation of a hollow conical receiving beam, or section thereof, is illustrated in U.S. Pat. No. 4,052,693 and one example of the generation of nested concentric hollow beams is illustrated in U.S. Pat. No. 4,311,391.

Figure 2A:
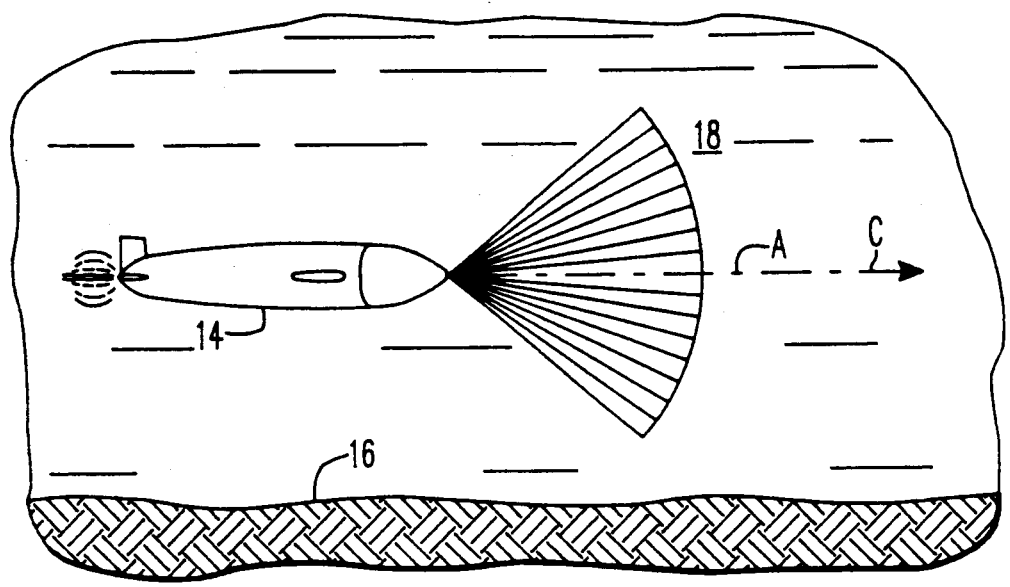
FIGS. 2A and 2B are respective schematic elevation and plan views of a carrier borne sonar system which utilizes a plurality of hollow, conical beams for examination of a target area.
Figure 2B:
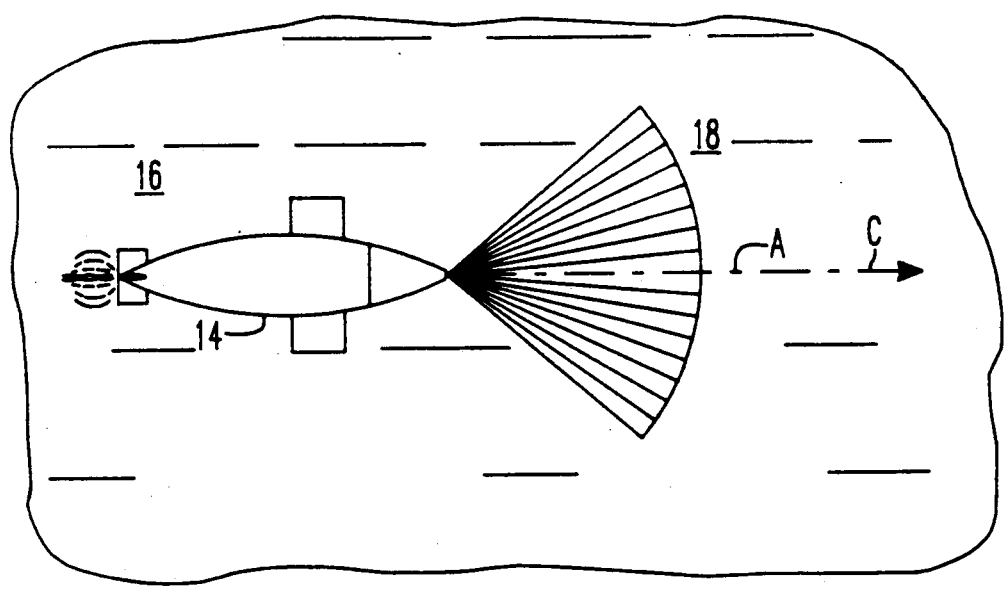

FIGS. 2A and 2B illustrate, in respective elevation and plan views, an underwater carrier vehicle 14 proceeding along a course line C at some predetermined altitude above the bottom 16 of a body of water. The vehicle carries sonar apparatus, including a multi-element elongated rod-like receiver transducer, which generates a set 18 of hollow conical receiver beams such as illustrated in FIG. 1. The hollow conical beams all have the same cone axis A which is in the same direction as the course line C during operation of the apparatus.

Figure 3A:
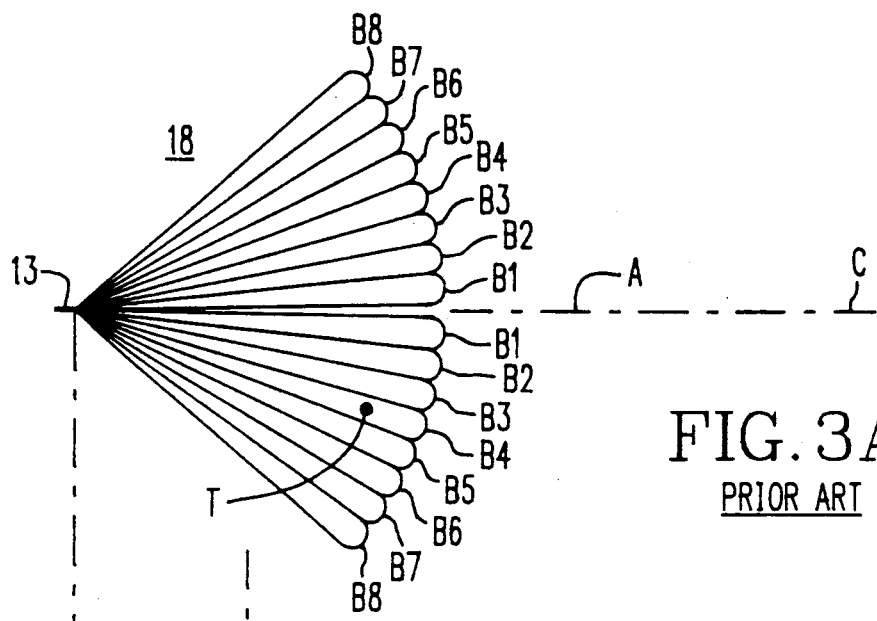
FIGS. 3A and 3B are sectional views of the beams utilized in FIG. 2A showing the orientation of the beams at two successive positions of the apparatus.

FIG. 3A illustrates the receiver transducer 13 and a section through the conic axis A of a plurality of hollow conical beams labeled B1-B8. After an acoustic transmission takes place, the reflected acoustic energy from a target T is detected by conical beam B4 at time $t_1$. During travel of the apparatus along the course line C, a subsequent acoustic transmission takes place and the reflected energy from the same target T at the exact same location is detected by beam B8 at time $t_2$ after having travelled a distance D from the initial reception.

Figure 4:
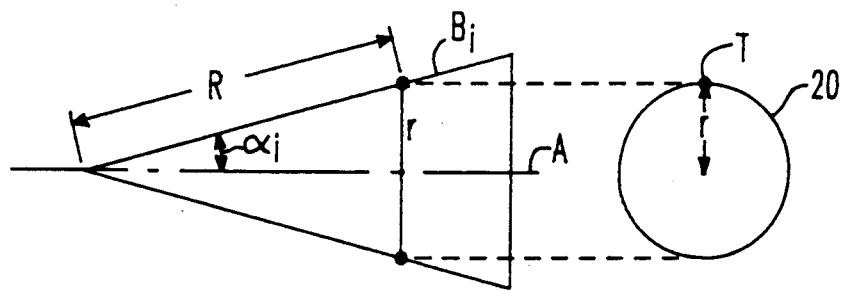
FIG. 4 is a simplified line diagram showing the intersection of a conical beam with a target.

The bearing to the target is determined by which of the beams detected the target while the time from acoustic transmission to subsequent reception will provide an indication of the range to the target. In FIG. 4, a typical hollow conical beam Bi is illustrated and for ease of presentation, the thickness of the beam has been neglected. A target T lies on the surface of conical beam Bi and the slant range along the cone surface to the target is the distance R. The apparatus cannot however determine the exact position of the target T since the range R can be any element of the conical surface such that the target T can lie anywhere on the surface of the cone which is at a distance R from the apex. The loci of all points defines a circle 20 of radius r and target T could be anywhere on that circle. Mathematically, $r = R \sin \alpha_i$, where $\alpha_i$ is the half angle of the conic beam Bi.

Figure 3B:
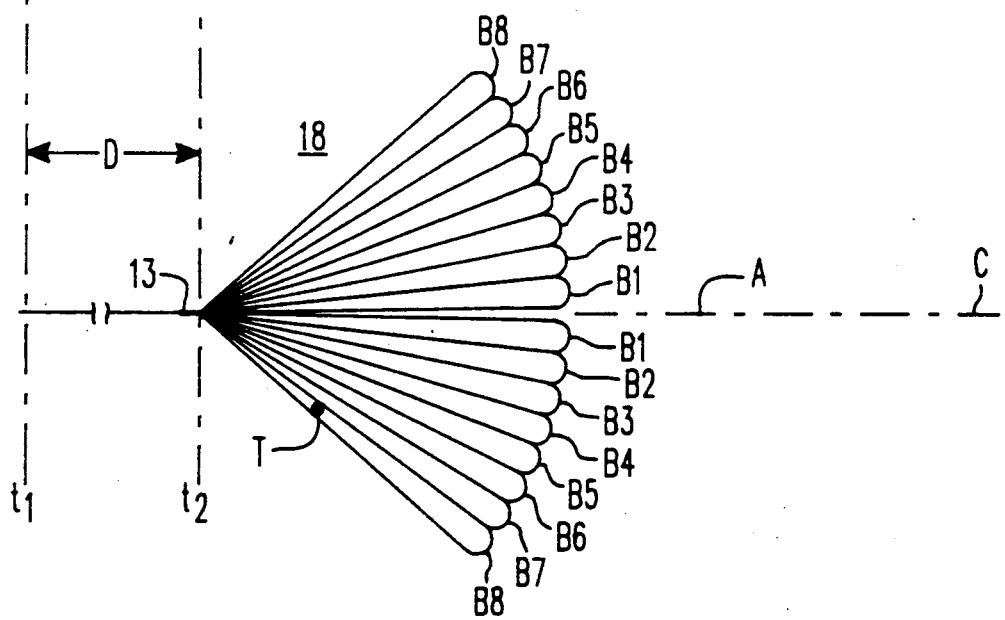
Figure 5:
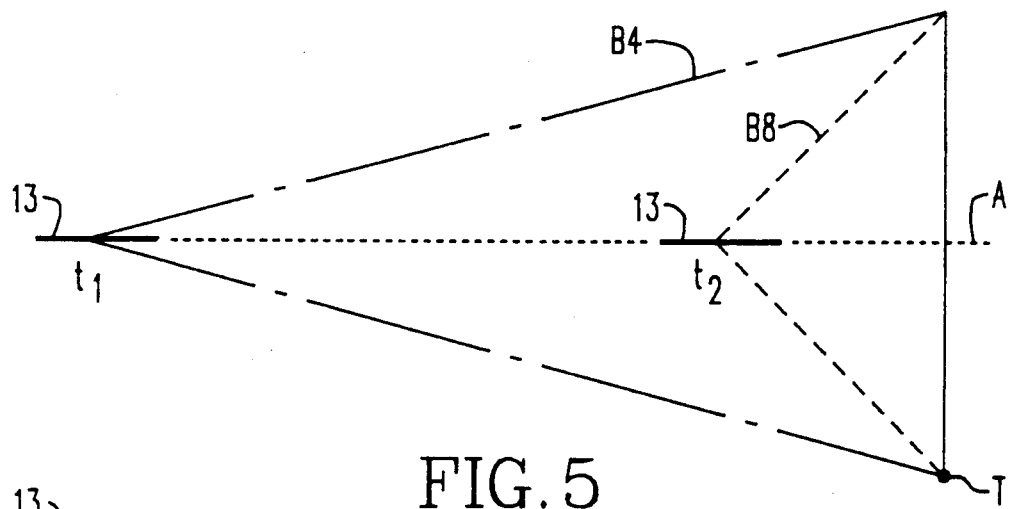
FIG. 5 is a simplified line diagram illustrating the intersection of two different conical beams with a target as may occur as a result of two transmissions.
Figure 5A:
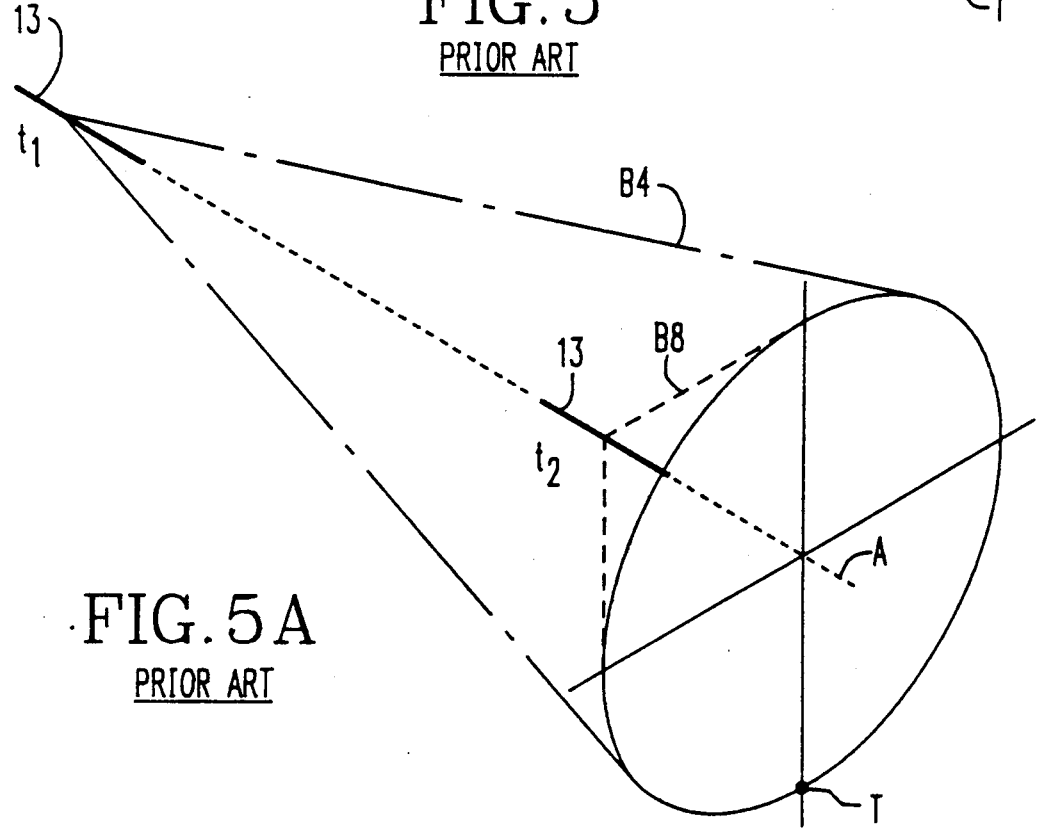
FIG. 5A is a perspective view of the situation illustrated in FIG. 5.

With two successive target returns as depicted in FIGS. 3A and 3B, beams B4 and B8 detect the target at times $t_1$ and $t_2$ as further illustrated in FIG. 5. The target T, however, may lie anywhere on a circle associated with beam B4 and anywhere on an identical circle associated with beam B8. That is, and as illustrated in FIG. 5A, although two successive returns may be recorded by respective beams B4 and B8, the exact location of target T is unknown since it may lie anywhere along the circle 22. In order to particularly determine the exact location of the target, additional sonar equipment and associated signal processing apparatus is required.

With the present invention, the target can be identified as occupying one of two positions without the requirement of additional sonar apparatus. This is accomplished by maintaining the cone axis A for all of the hollow conical beams at a predetermined angle $\theta$ with respect to the course line C during operation.

Figure 6A:
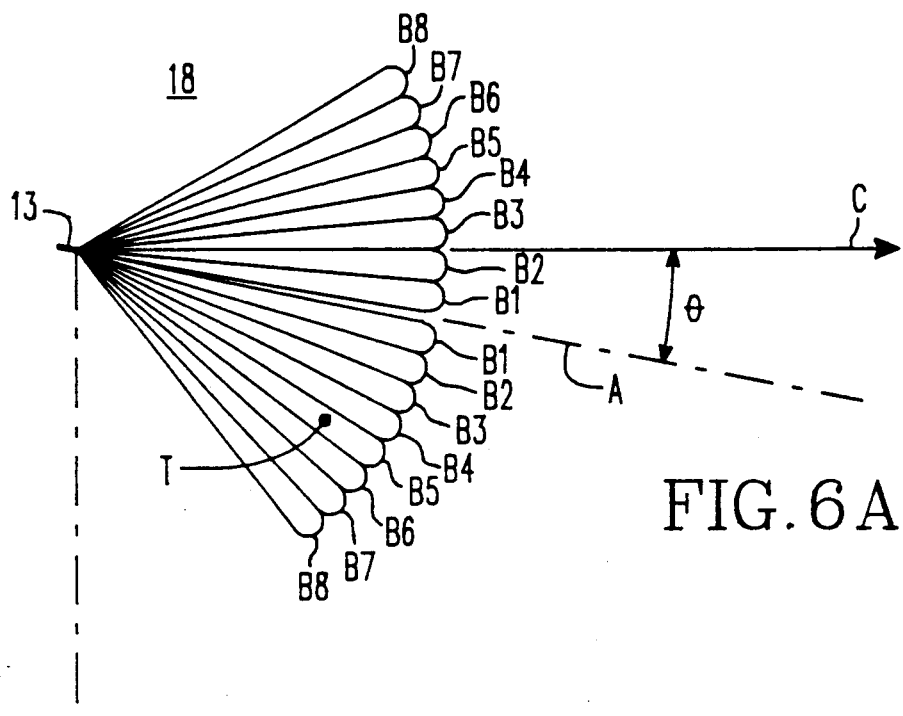
FIGS. 6A and 6B illustrate the orientation of hollow conical beams on two different transmissions, in accordance with the present invention.
Figure 6B:
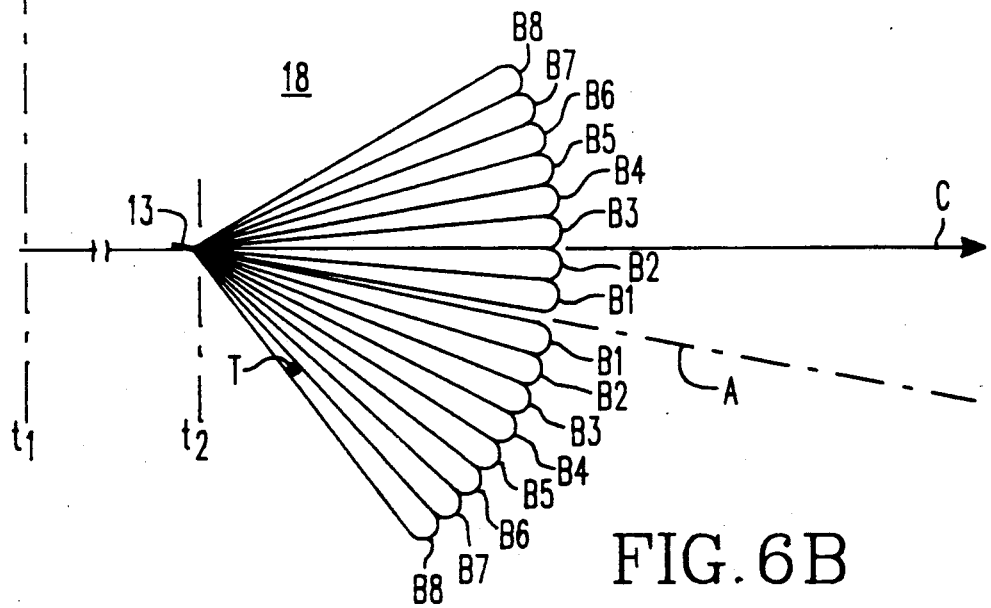
Figure 7:
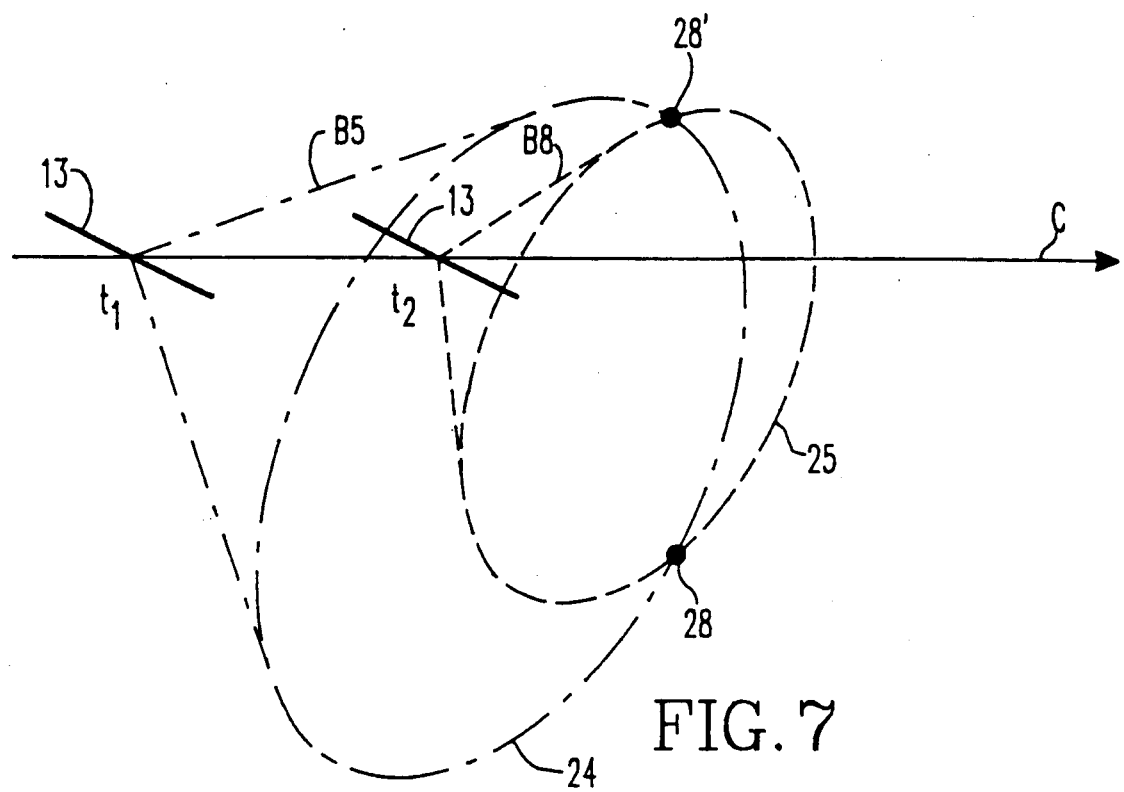
FIG. 7 is a perspective view illustrating the intersection of the beams of FIGS. 6A and 6B with a target.

As illustrated in FIG. 6A, with the present invention, an acoustic transmission takes place, and a target is detected by beam B5 at time $t_1$. After a subsequent projection, and as illustrated in FIG. 6B, the same target produces a return on beam B8 at time $t_2$. The target T therefore as a result of the first return may lie anywhere on a particular circle of beam B5 and as a result of the second return, may lie anywhere on a particular circle of beam B8. With the cone axis at an angle $\theta$ relative to the course line C however, the circles are not coincident as in the case of FIG. 5A, but are laterally offset from one another as illustrated in FIG. 7.

The target lies somewhere on the circle 24 of conic beam B5 and somewhere on the circle 25 of conic beam B8. The only locations therefore where the target can substantially lie on both circles are at points 28 or 28' which are the intersection points of the two circles. If the apparatus is used for bottom mapping or for the detection of targets on the bottom or moored from the bottom, then by proper beam pattern management and/or signal processing, the exact location of the target may be identified as point 28 such that the mirror or complementary indication at point 28' may be disregarded.

Figure 8:
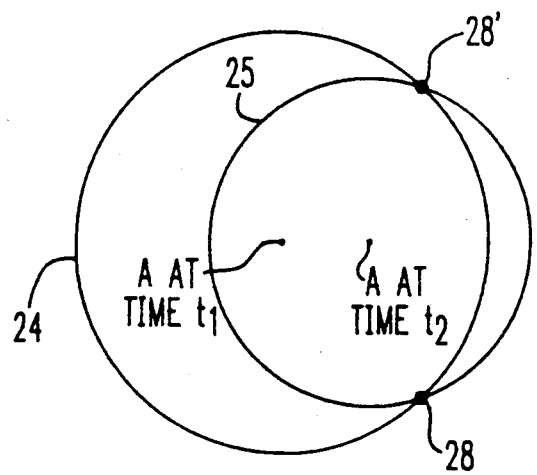
FIG. 8 is a view perpendicular to the conic circles of FIG. 7.

FIG. 8 is a view of the circles 24 and 25 looking directly along the lines of the conic axes at times $t_1$ and $t_2$ illustrating the lateral offset.

Figure 9:
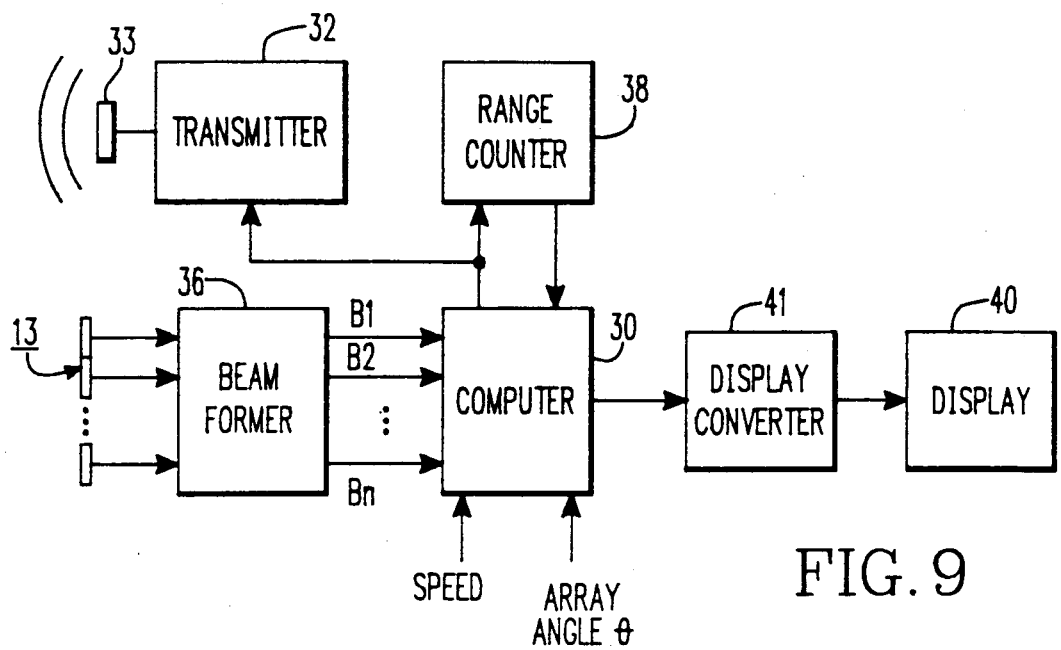
FIG. 9 is a block diagram illustrating apparatus which may be utilized in the practice of the present invention.

Apparatus for implementing the present invention is illustrated by way of example in FIG. 9. Computer 30 provides a transmit signal to transmitter means 32 whereby transmitter transducer projects a pulse of acoustic energy toward a target area under investigation. Any acoustic returns are received by multi-element elongated receiver transducer 13 oriented at a constant angle greater than 0° with respect to the direction of travel of the apparatus.

The outputs of the elements of the receiver transducer 12 are provided, in a well known manner, to a beamformer 36 which forms the individual hollow conical receiver beams B1–Bn and provides respective corresponding output signals for these beams to the computer 30.

At the start of a transmission, the computer 30 provides an initiating signal to range counter 38 which then provides a running count as an input to the computer for target slant range determination for each of the formed beams. The computer additionally receives an indication of the carrier speed as well as the angle of the array relative to the direction of travel, although if desired, this value could be a constant.

If a target indication is received on any of the receiver beams, the range to the target can be determined from the range counter output when the counter indication is received and since the half angles $\alpha_i$ of all of the beams are known a priori, each target indication appearing on one of the beams can be mapped into a corresponding circle (as brought out in FIG. 4) and stored in the computer memory. A plurality of targets within the field of view of the beams will produce a corresponding plurality of circles at different slant ranges on the same and/or different beams, dependent upon the location of the targets. The process is repeated for one or more subsequent transmissions such that circle intersections (as in FIG. 7) from the plurality of transmissions may be determined and stored in the computer memory. The information in memory relative to the target locations is provided to display 40 after suitable conversion in display converter 41 which, for example, may store the display signals for presentation on a conventional cathode ray tube or other type of display.

Figure 10:
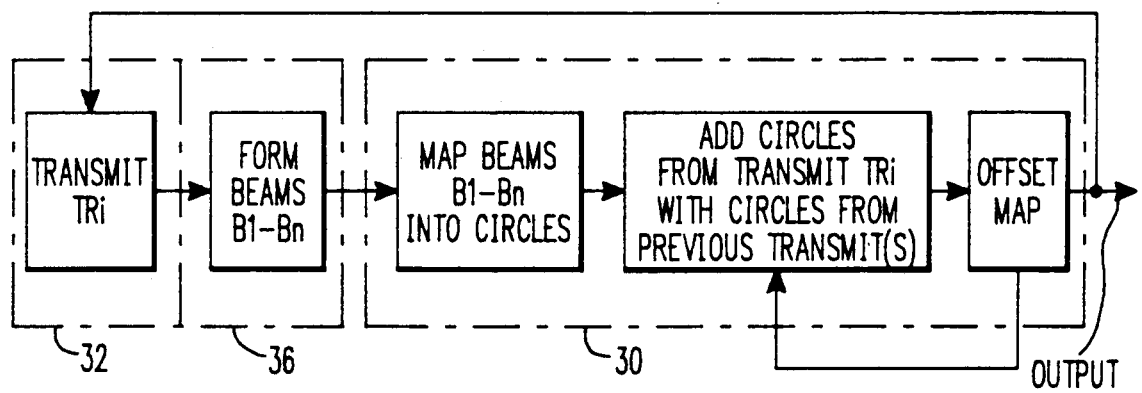
FIG. 10 is a flowchart illustrating the operation of the present invention.

FIG. 10 illustrates a flowchart of the operation. The transmitter means 32 provides a transmit TRi, the results of which are formed into beams B1–Bn by beam former 36. The computer 30 maps target returns from the beams into respective circles and adds those circles from the present transmit with the circles from one or more previous transmits. The circles are offset by the offset map since the array is not moving in the direction of its axis. The offset map offsets the circle, or circles, by an amount which is a function of the forward speed and angle of the array relative to the direction of travel, both of which are provided to the computer, as discussed with respect to FIG. 9.

After the addition of the circles, an output indication is provided and the next transmit signal is generated with the results of the offset map being fed back to add to the circles resulting from this next transmission.

By way of example, let it be assumed for purposes of illustration, that only single target is present as in the scenario of FIG. 7. The target return at time $t_1$ results in a circle 24. The circle may be divided into a plurality of points each of which has a corresponding memory location in the computer memory. The strength of the target return may then be stored as a certain magnitude at each of the memory locations corresponding to the circle.

At subsequent time $t_2$ the target return results in circle 25 in the same plane as circle 24. The strength of the target return is stored at each of the memory locations corresponding to circle 25 by adding to what was previously stored at those locations. Only at memory locations corresponding to points 28 and 28' will there be a previously stored value from circle 24. Accordingly, point locations 28 and 28' will have greater magnitudes stored than any of the other memory locations and will indicate possible target locations.

The above procedure may also be followed for the case of multiple targets. If the apparatus mission is to detect only targets of interest in the lower quadrants, then only data with respect to semicircles need be recorded and/or involved in the calculations.

Figure 11:
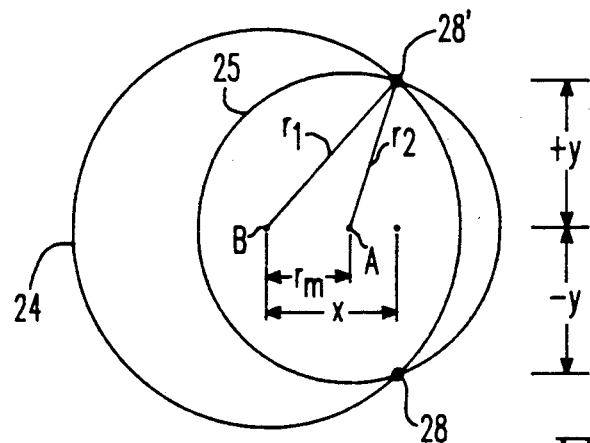
FIG. 11 is a view similar to FIG. 8 illustrating certain distances.

If the apparatus is intended to just look for targets ahead of the carrier in the water column and not process bottom returns, then the determination of target location may be accomplished by simple mathematical methods. By way of example, FIG. 11 duplicates FIG. 8 and shows the two intersecting circles 24 and 25 which would give rise to target indications at location points 28 and 28'. Point B is the center of circle 24 and is arbitrarily chosen as the origin. Point A is the center of circle 25 and is offset from point B by a distance $r_m$. With $r_2$ the radius of circle 24 and $r_1$ the radius of circle 25, it may be mathematically demonstrated that the intersection points of the two circles will be:

$$x = \frac{-c}{2r_m}$$

and $$y = \pm r_2^2 - \frac{C^2}{4r_m^2}$$

where $c = r_1^2 - r_m^2 - r_2^2$.

Accordingly, there has been described apparatus which can identify a target as being located at one of two possible points. The apparatus has been described utilizing a plurality of simultaneously generated hollow conical receiver beams. It is to be understood that identical results may be obtained utilizing one or more hollow conical beam which may be swept in angle from some maximum to some minimum value to sweep the area under investigation and perform the same function as the simultaneously formed beams. Further, the set of hollow conical beams need not look forward of the vehicle travel but may look astern at targets already passed, or even look forward on a first transmission and astern on a subsequent transmission once the vehicle has passed the target.

I claim:

1. Sonar apparatus comprising:
    (a) means for periodically projecting acoustic energy toward a target area under investigation by said sonar apparatus as said sonar apparatus travels along a course line during investigation of said target area;
    (b) means for receiving reflected acoustic energy from said target area and including beam former means operable to form a plurality of nested hollow conical receiver beams all having a common cone axis;
    (c) means for maintaining said cone axis at a predetermined angle relative to said course line such that said cone axis and said course line are non-coincident; and
    (d) means for recording and comparing acoustic returns from at least two successive acoustic projections and displaying the results of said comparison.

2. Carrier-borne sonar apparatus, comprising:
    (a) means for transmitting an acoustic pulse toward a target area under investigation in repetitive transmission cycles during course of travel of said carrier along a course line;
    (b) means including transducer means for forming a plurality of hollow conical beams directed toward said target area, said plurality of hollow conical beams being nested and all having a common cone axis which is at an angle $>0$ with respect to said course line;
    (c) circuit means operable, in the presence of a target reflecting said acoustic pulse, to provide an indication of target bearing by determining which of said conical beams has detected said target, as well as an indication of the range to said target to thereby define a circular loci of points at which said target may be located;
    (d) said circuit means being operable, at least one subsequent position of said apparatus along said course line, to indicate a new target bearing for each said subsequent position by determining which of others of said conical beams has detected the same said target, as well as the range to said target, to thereby define at least a second circular loci of points which intersects said first mentioned circular loci of points at the location of said target.

3. Carrier-borne sonar apparatus, comprising:
    (a) means for transmitting an acoustic pulse toward a target area under investigation in repetitive transmission cycles during course of travel of said carrier along a course line;
    (b) means including transducer means for forming a plurality of hollow conical beams directed toward said target area, said plurality of hollow conical beams being nested and all having a common cone axis which is at an angle $>0$ with respect to said course line;
    (c) circuit means operable, in the presence of a target reflecting said acoustic pulse, to provide an indication of target bearing by determining which of said conical beams has detected said target, as well as an indication of the range to said target to thereby define a circular loci of points at which said target may be located;
    (d) said circuit means being operable, at a subsequent position of said apparatus along said course line, to indicate a new target bearing by determining which of another of said conical beams has detected the same said target, as well as the range to said target, to thereby define a second circular loci of points which intersects said first mentioned circular loci of points at the location of said target as well as a complementary location to thereby reduce the actual target position to two possible locations.

4. Apparatus according to claim 1 wherein:
    (a) said beam former means simultaneously forms said plurality of nested hollow conical receiver beams.

5. Apparatus according to claim 1 wherein:
    (a) said means for recording and comparing includes a computer operable to map a target return on a particular one of said conical receiver beams into a corresponding circle and to add circles resulting from one acoustic transmission with those from at least one subsequent acoustic transmission.

* * * * *